United States Patent
Tajima et al.

(10) Patent No.: US 8,290,497 B2
(45) Date of Patent: Oct. 16, 2012

(54) MOBILE STATION APPARATUS AND CELL SELECTING METHOD

(75) Inventors: Yoshiharu Tajima, Kawasaki (JP);
Kazuhisa Obuchi, Kawasaki (JP);
Yoshiaki Ohta, Kawasaki (JP);
Yoshihiro Kawasaki, Kawasaki (JP);
Yoshinori Tanaka, Kawasaki (JP);
Katsumasa Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 231 days.

(21) Appl. No.: 12/644,398

(22) Filed: Dec. 22, 2009

(65) Prior Publication Data
US 2010/0099414 A1   Apr. 22, 2010

Related U.S. Application Data

(63) Continuation of application No. PCT/JP2007/063700, filed on Jul. 9, 2007.

(51) Int. Cl.
*H04W 4/00* (2009.01)
*H04W 36/00* (2009.01)
*H04W 40/00* (2009.01)
*H04W 72/00* (2009.01)
*G08C 17/00* (2006.01)
*H04B 7/212* (2006.01)

(52) U.S. Cl. .............. 455/443; 455/435.2; 455/435.3; 455/436; 455/456.1; 455/574; 455/437; 455/440; 455/441; 455/442; 455/444; 455/448; 455/449; 455/453; 370/311; 370/331; 370/347

(58) Field of Classification Search .......... 455/436–444; 370/328–338
See application file for complete search history.

(56) References Cited

U.S. PATENT DOCUMENTS

| | | | |
|---|---|---|---|
| 2001/0031638 A1 | 10/2001 | Korpela et al. | |
| 2002/0006805 A1 | 1/2002 | New et al. | |
| 2008/0167089 A1* | 7/2008 | Suzuki et al. | 455/574 |
| 2010/0113023 A1* | 5/2010 | Huang et al. | 455/436 |

FOREIGN PATENT DOCUMENTS

| | | |
|---|---|---|
| JP | 2000-358268 | 12/2000 |
| JP | 2001-069063 | 3/2001 |
| JP | 2001-285911 | 10/2001 |
| JP | 2002-112301 | 4/2002 |
| JP | 2003-534675 | 11/2003 |
| JP | 2004-504783 | 2/2004 |

(Continued)

OTHER PUBLICATIONS

R2-063068 (3GPP TSG RAN WG2 #52bis; Measurements in E-UTRAN; Published Nov. 10, 2006).*

(Continued)

*Primary Examiner* — Dwayne Bost
*Assistant Examiner* — Nalini Yerneni
(74) *Attorney, Agent, or Firm* — Myers Wolin, LLC

(57) ABSTRACT

A mobile station apparatus, which is used in a mobile communication system including plural base stations, includes a receiver that receives a first signal from any one of the base stations of a first cell group covering a relatively large area and of a second cell group covering a relatively small area; a determining unit that determines an intermittent receiving cycle based on the received first signal; and a setting unit that, based on the determined intermittent receiving cycle, selects a cell group from among the first cell group and the second cell group, and sets the receiver to perform intermittent reception of a second signal transmitted from a base station belonging to the selected cell group.

6 Claims, 5 Drawing Sheets

FOREIGN PATENT DOCUMENTS

| | | |
|---|---|---|
| JP | 2004-304280 | 10/2004 |
| WO | 02/07459 | 1/2002 |
| WO | WO 2007088381 A1 * | 8/2007 |

OTHER PUBLICATIONS

R2-070088 3GPP TSG RAN WG2 #56bis Agenda Item 5.2.7: Summary of email discussion on DRX in LTE_ACTIVE; Published Jan. 12, 2007.*

Index of TSG RAN2 56BIS documents for the Publication date reference of R2-070088 above, retrieved Sep. 23, 2011.*

Translation of International Preliminary Report on Patentability and Written Opinion of corresponding International Patent Application No. PCT/JP2007/063700, issued Feb. 4, 2010.

3GPP TR 25.913 V7.3.0; 3rd Generation Partnership Project; Technical Specification Group Radio Access Network; "Requirements for Evolved UTRA (E-UTRA) and Evolved UTRAN (E-UTRAN)"; (Release 7); Dated Mar. 2006.

International Search Report and Written Opinion for corresponding International Patent Application No. PCT/JP2007/063700, mailed Oct. 16, 2007.

Notice of Rejection issued for corresponding Japanese Patent Application No. 2009-522449 with partial English translation mailed Apr. 24, 2012.

* cited by examiner

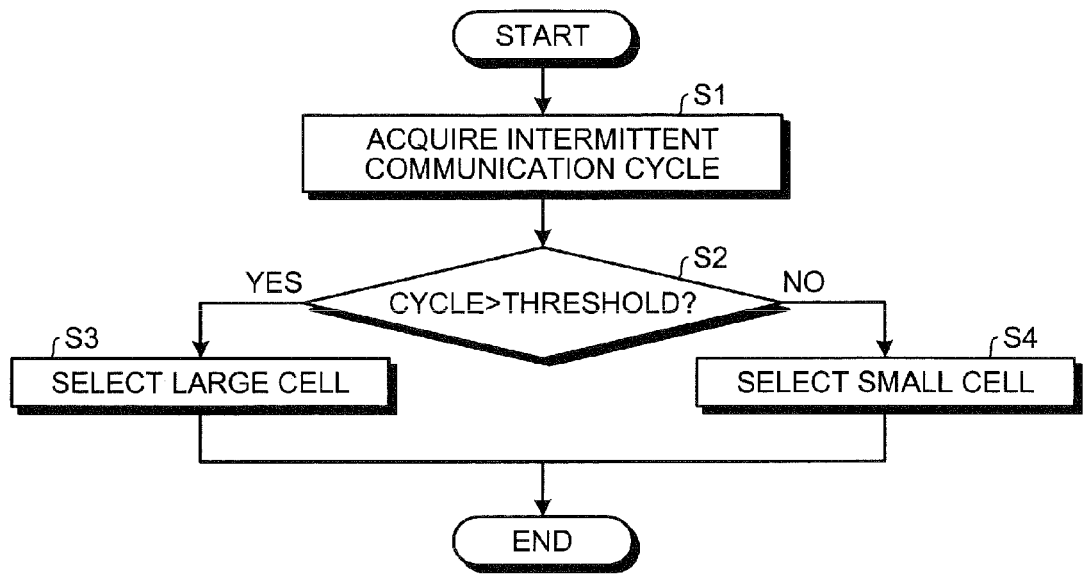
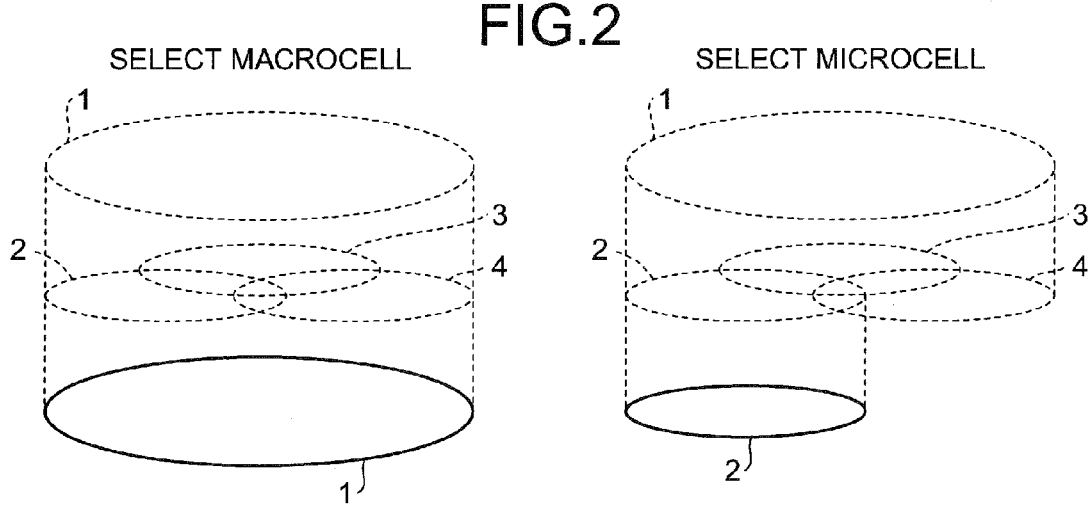

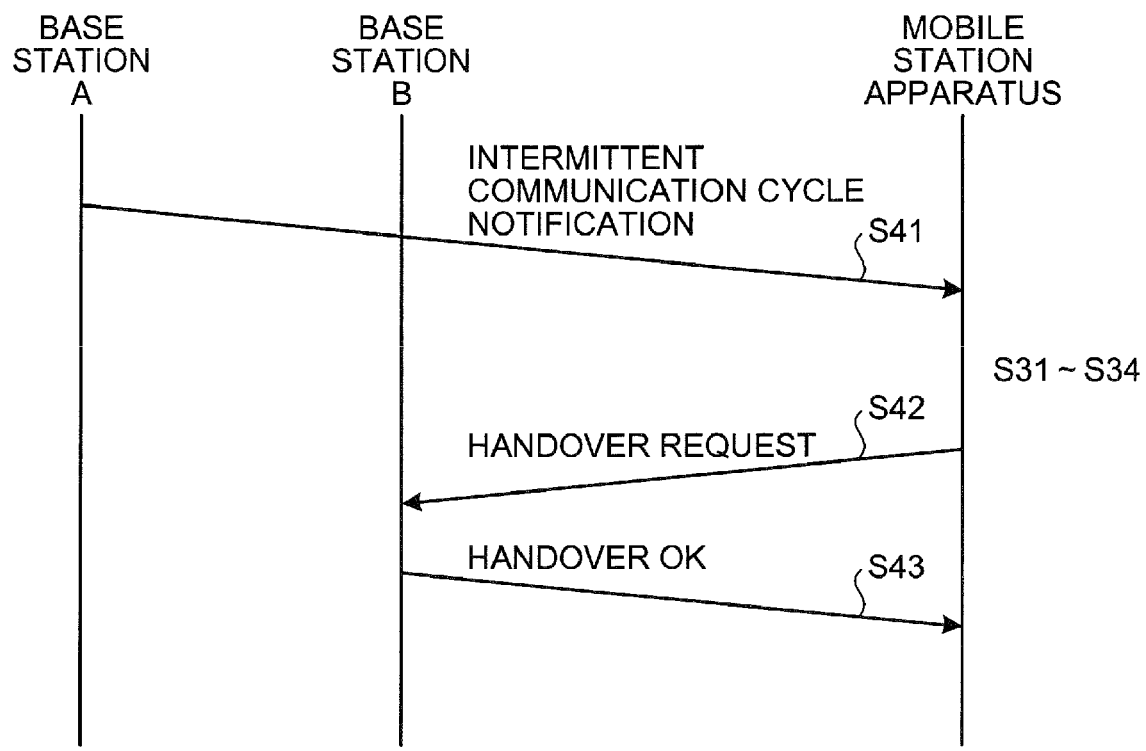

MOBILE STATION APPARATUS AND CELL SELECTING METHOD

CROSS-REFERENCE TO RELATED APPLICATIONS

This is a continuation of Application PCT/JP2007/063700, filed on Jul. 9, 2007, now pending, the contents of which are herein wholly incorporated by reference.

FIELD

The embodiment discussed herein is related to a mobile station apparatus and cell selecting method.

BACKGROUND

Recently, in mobile communication systems, such as those for mobile telephones, as one example of faster data communication specifications, Long Term Evolution (LTE) has been under investigation. LTE standardization is progressing under the 3rd Generation Partnership Project (3GPP), a standardization organization for third generation mobile communication systems, and is a communication scheme expanding third generation mobile telephone (3G) communication performed under wideband code division multiple access (W-CDMA) schemes (see, for example, "3GPP TR 25.913 V7.3.0(2006-03))", 3rd Generation Partnership Project, p. 1-18).

Under LTE, to reduce energy consumption, mobile stations perform intermittent reception (discontinuous receiving for power saving (DRX)) of signals from a base station not only while waiting for communication but also during communication. During intermittent reception, a given mobile station receives a scheduling channel periodically and checks for transmissions addressed thereto. Further, to maintain synchronization of the uplink, the given mobile station performs uplink transmission to the base station periodically (discontinuous transmission (DTX)).

Further, among network configuration methods realizing internet protocol (IP) communication, a method has been proposed under which various types of wireless base station communication areas have hierarchical relations. A method has been further proposed where, when a wireless terminal equipped with various types of wireless devices has one or more of the wireless devices set to a hibernation mode, route registry packets that include an identifier of the base station having the largest communication area among wireless base stations counterpart to the wireless devices, are transmitted to a core router (see, for example, Japanese Laid-Open Patent Publication No. 2004-304280 ([claim 2], [claim 5])).

SUMMARY

According to an aspect of an embodiment, a mobile station apparatus, which is used in a mobile communication system including plural base stations, includes a receiver that receives a first signal from any one of the base stations of a first cell group covering a relatively large area and of a second cell group covering a relatively small area; a determining unit that determines an intermittent receiving cycle based on the received first signal; and a setting unit that, based on the determined intermittent receiving cycle, selects a cell group from among the first cell group and the second cell group, and sets the receiver to perform intermittent reception of a second signal transmitted from a base station belonging to the selected cell group.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a flowchart of a cell selecting method according to an embodiment.

FIG. 2 is a schematic of the cell selecting method according to a first example.

FIG. 8 is a sequence chart for the cell selection processing performed by the mobile station apparatus according to the second example.

DESCRIPTION OF EMBODIMENTS

Figure 3:
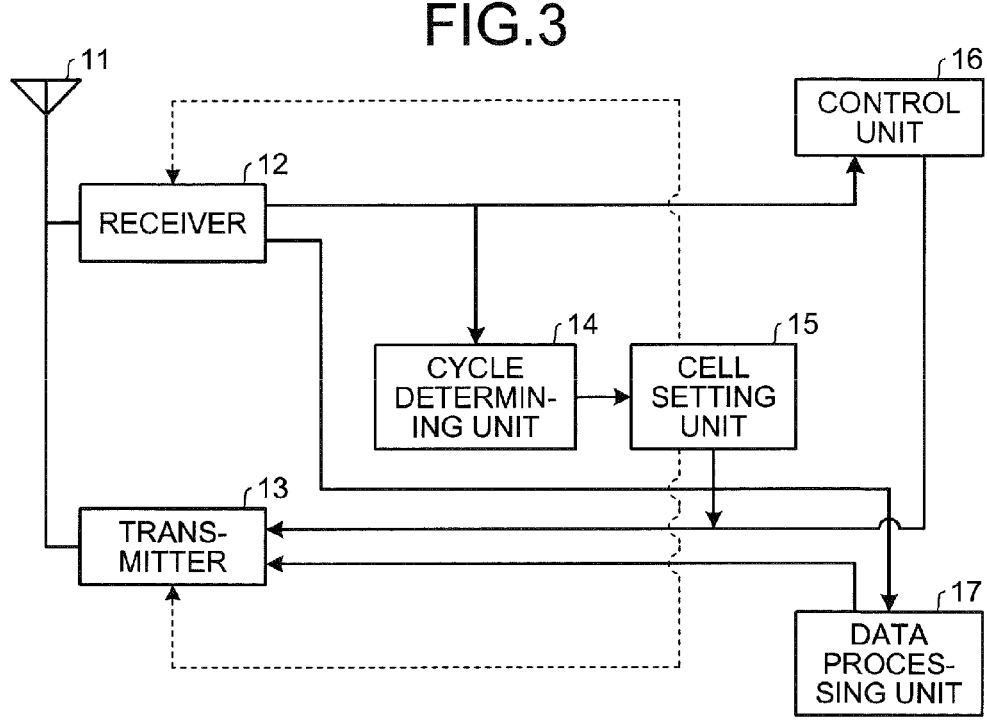
FIG. 3 is a block diagram of a configuration of a mobile station apparatus according to the first example.

Preferred embodiments of the present invention will be explained with reference to the accompanying drawings. However, the present invention is not limited by the examples. A first example of an application to a mobile communication system in accordance with LTE will be explained.

A cell selecting method according to an embodiment will be explained. In the embodiment, in a mobile communication system where a mobile station performs intermittent communication with a base station, the size of the cell of a base station to which the mobile station is connected is a size based on the intermittent communication cycle. Under an intermittent communication state, the size of the cell of the base station to which the mobile station is connected is a size based on the intermittent communication cycle. Under the intermittent communication, the mobile station performs, with respect to a base station, transmission and reception intermittently at a fixed cycle.

FIG. 1 is a flowchart of a cell selecting method according to an embodiment. As depicted in FIG. 1, the mobile station acquires the intermittent communication cycle (step S1). The intermittent communication cycle is reported to the mobile station from a base station or a network. The mobile station compares the acquired intermittent communication cycle with a preset threshold, and determines whether the intermittent communication cycle exceeds the threshold (step S2).

If the intermittent communication cycle exceeds the threshold (step S2: YES), a wide cell (large cell) is selected (step S3); otherwise (step S2: NO), a narrow cell (small cell) is selected (step S4). In the selection of a large cell at step S3 or the selection of a small cell at step S4, configuration may be as follows. When plural cells of various sizes are arranged in a hierarchy, a macrocell having a wide communicable range is selected at step S3 and a microcell having a narrow communicable range is selected at step S4 (a first example described hereinafter). The large cells and small cells are separable according to the frequency of signals (including subcarriers)

transmitted for each of the cells being different and by the allocation spread codes that differ. It is preferable for each of the cells to be formed by a different base station.

Alternatively, irrespective of whether the configuration of a cell is hierarchical, the handover threshold for the mobile station may be decreased at step S3 and may be increased at step S4 (a second example hereinafter). If the handover threshold becomes small, the communicable range of the mobile station becomes wide and thus, an effect similar to the cell becoming large is achieved. On the contrary, if the handover threshold becomes large, the communicable range of the mobile station becomes narrow and thus, an effect similar to the cell becoming small is achieved.

FIG. 2 is a schematic of the cell selecting method according to the first example. As depicted in FIG. 2, in the first example, cell configuration is a hierarchy of a macrocell 1 and microcells 2, 3, 4 (indicated by broken lines). In such a hierarchical configuration, the same position is included multiple cells of different sizes. Typically, in such cell configurations, according to the speed of movement of the mobile station, a service received by the mobile station, etc., a cell of an appropriate size is selected. In the left portion of FIG. 2, macrocell 1 has been selected and in the right portion of FIG. 2, microcell 2 has been selected.

FIG. 3 is a block diagram of a configuration of the mobile station apparatus according to the first example. As depicted in FIG. 3, the mobile station apparatus according to the first example includes an antenna 11, a receiver 12, a transmitter 13, a cycle determining unit 14, a cell setting unit 15, a control unit 16, and a data processing unit 17. The receiver 12 intermittently receives through the antenna 11, a signal transmitted from a non-depicted base station. The receiver 12 receives from the base station (network), a signal indicative of the intermittent communication cycle.

The transmitter 13 intermittently transmits a signal to the base station. Under an intermittent communication state, during an interval when transmission is not performed, the receiver 12 and the transmitter 13 are in a suspended state. The cycle determining unit 14, based on the signal indicative of the intermittent communication cycle received by receiver 12, determines the intermittent communication cycle. The cell setting unit 15 compares the intermittent communication cycle determined by the cycle determining unit and a preset threshold, and determines whether the intermittent communication cycle exceeds the threshold. The threshold may be transmitted from the base station, in which case the mobile station apparatus receives and sets the threshold. In this case, the threshold is transmittable as report information.

The cell setting unit 15 selects a base station belonging to a macrocell level (selects one base station of macrocell 1), if the intermittent communication cycle is long; and from among base stations belonging to a microcell level, selects the base station of the microcell (microcell 2, 3, or 4) in which the mobile station is located, if the intermittent communication cycle is short. If a cell of a level different from that of the current cell is selected, the cell setting unit 15 outputs an interlevel handover request to the base station from the transmitter 13 through the antenna 11 (a request for the transmission of such a request may be made to the control unit 16). On the other hand, in the case of movement between cells of the same level, the cell setting unit 15 does not output an interlevel handover request.

The cell setting unit 15 makes appropriate settings in the receiver 12 and the transmitter 13 to enable intermittent communication with the selected base station.

The base station or a higher level device thereof receives the interlevel request from the mobile station apparatus and includes a administrating unit that manages and records the level to which mobile station apparatuses belong. The intermittent communication performed with the mobile station apparatus is executed based on the information managed by the administrating unit. That is, if handover to macrocell 1 is requested via an interlevel handover request, the request is granted to the mobile station apparatus and meanwhile, the administrative state of the mobile station apparatus is updated to macrocell 1 in the administrative unit.

If movement between microcells is detected, the control unit 16 makes an intralevel handover request.

The control unit 16, based on the reception level of a received signal, controls a common handover (intralevel handover) and further governs control overall. The data processing unit 17 performs demodulation and decoding processing for the received signal, encoding and modulation processing for transmission data, as well as other data processing.

Figure 4:
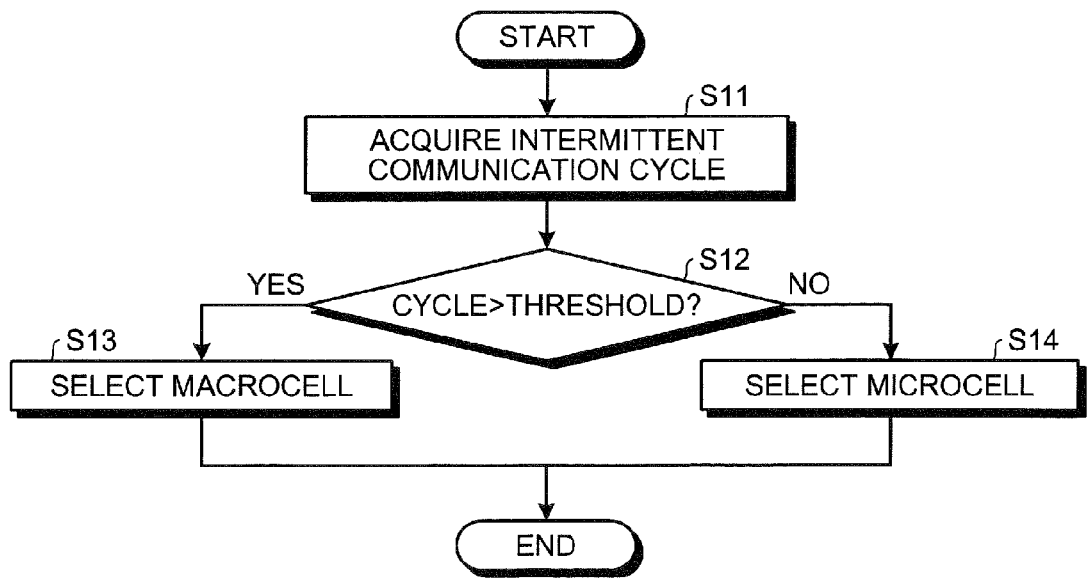
FIG. 4 is a flowchart of operations performed by the mobile station apparatus according to the first example.

FIG. 4 is a flowchart of operations performed by the mobile station apparatus according to the first example. As depicted in FIG. 4, when cell selection processing commences, the cycle determining unit 14 acquires the intermittent communication cycle from the base station or network via the antenna 11 and the receiver 12 (step S11). The cycle determining unit 14 compares the acquired intermittent communication cycle with a preset threshold, determines whether the intermittent communication cycle is larger than the threshold (step S12), and informs the cell setting unit 15 of the larger value among the acquired intermittent communication cycle and the preset threshold.

If the intermittent communication cycle is larger (step S12: YES), the cell setting unit 15 selects a macrocell (step S13), ending the cell selection processing. On the other hand, if the intermittent communication cycle is not larger (step S12: NO), the cell setting unit 15 selects the microcell in which the mobile station apparatus is located at that moment (step S14), ending the cell selection processing.

Figure 5:
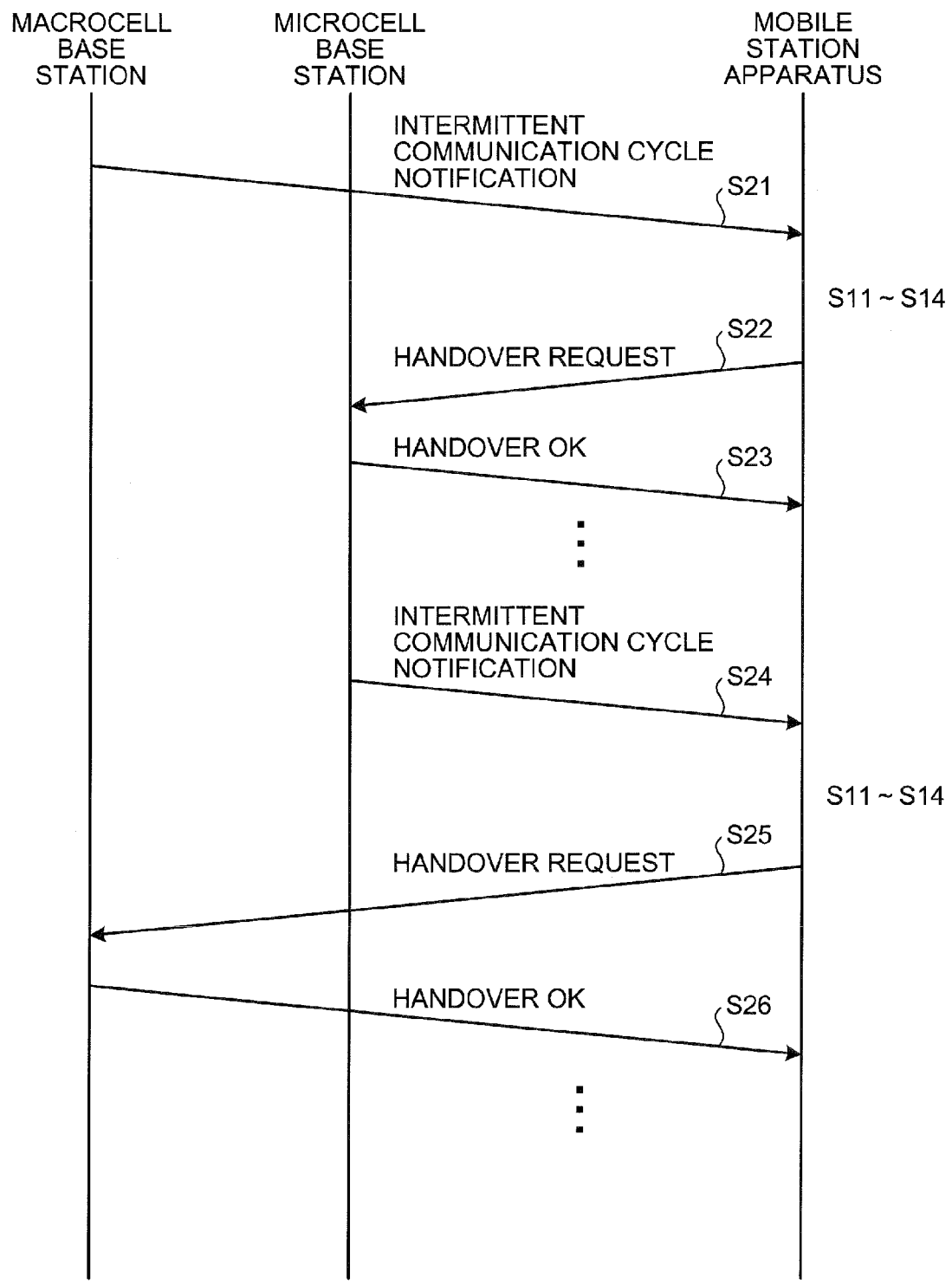
FIG. 5 is a sequence chart for the cell selection processing performed by the mobile station apparatus according to the first example.

FIG. 5 is a sequence chart for the cell selection processing performed by the mobile station apparatus according to the first example. Here, the mobile station apparatus is in a macrocell. As depicted in FIG. 5, the base station of the macrocell informs the mobile station apparatus of the intermittent communication cycle (step S21). Upon receiving the intermittent communication cycle, the mobile station apparatus performs the cell selection processing depicted in FIG. 4 (step S11 to step S14). Upon consequently selecting a microcell, the mobile station apparatus sends an interlevel handover request to the base station of the selected microcell (step S22). The base station of the microcell, in response to the handover request, returns a handover OK reply (step S23). Thus, handover from the macrocell to the microcell is completed.

If the mobile station apparatus further receives notification of the intermittent communication cycle from the base station of the microcell (step S24), the mobile station apparatus performs the cell selection processing depicted in FIG. (step S11 to step S14). Upon consequent selection of a macrocell, the mobile station apparatus sends an interlevel handover request to the base station of the macrocell (step S25). In response, the base station of the macrocell returns a handover OK reply (step S26). Thus handover from the microcell to the macrocell is completed.

According to the first example, if the intermittent communication cycle is long, the cell becomes larger, thereby making it difficult for an occasion to arise where the mobile station crosses a cell boundary to an adjacent cell. Therefore, occasions where communication is interrupted at handover rarely occur. Further, when the intermittent communication cycle is short, the cell becomes smaller and thus, the efficiency of frequency utilization increases.

Figure 6:
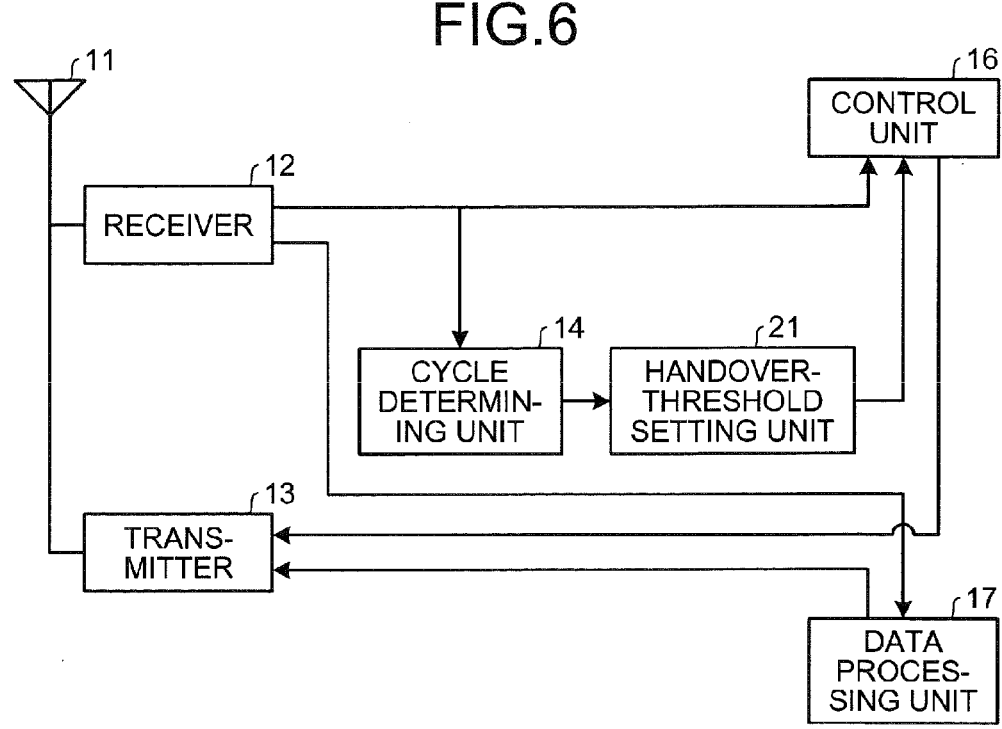
FIG. 6 is a block diagram of a configuration of the mobile station apparatus according to a second example.

FIG. 6 is a block diagram of a configuration of the mobile station apparatus according to the second example. As depicted in FIG. 6, the second example does not switch between macrocells and microcells according to the intermittent communication cycle, but rather by changing the handover threshold of the mobile station apparatus according to the intermittent communication cycle, changes in real terms, the size of the cell in which the mobile station is located. Accordingly, mobile station apparatus according to the second example includes a handover-threshold setting unit 21 in place of the cell setting unit 15. Components identical to those in the first example are given the same reference numerals used in the first example, and description therefor is omitted.

The handover-threshold setting unit 21 compares the intermittent communication cycle determined by the cycle determining unit 14 and a preset threshold, and determines whether the intermittent communication cycle exceeds the threshold. If intermittent communication cycle exceeds the threshold, the handover-threshold setting unit 21 reduces the handover threshold and if the intermittent communication cycle does not exceed the threshold, the handover-threshold setting unit 21 increases the handover threshold. In changing the handover threshold, the handover-threshold setting unit 21 may change the handover threshold stepwise, or continuously.

The control unit 16 compares the handover threshold set by the handover-threshold setting unit 21 and the reception level of the signal received by the receiver 12. If the handover threshold exceeds the reception level, the handover-threshold setting unit 21 determines a need for handover and outputs a handover request to the base station via the transmitter 13 and the antenna 11. On the other hand, if the handover threshold does not exceed the reception level, the handover-threshold setting unit 21 determines no need for handover, and does not output a handover request.

Figure 7:
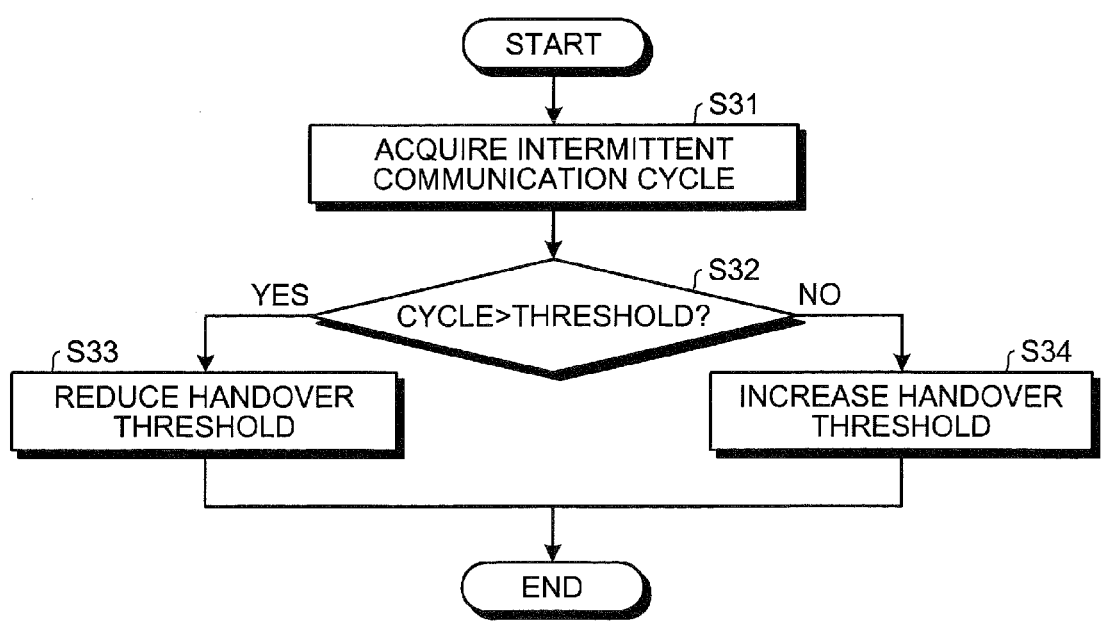
FIG. 7 is a flowchart of processing performed by the mobile station apparatus according to the second example.

FIG. 7 is a flowchart of processing performed by the mobile station apparatus according to the second example. As depicted in FIG. 7, when processing for setting the handover threshold commences, the cycle determining unit 14, via the antenna 11 and the receiver 12, acquires the intermittent communication cycle from the base station or network (step S31). The cycle determining unit 14 compares the acquired intermittent communication cycle with a preset threshold, determines whether the intermittent communication cycle is larger than the threshold (step S32), and informs the handover-threshold setting unit 21 of the larger value among the acquired intermittent communication cycle and the present threshold.

If the intermittent communication cycle is larger (step S32: YES), the handover-threshold setting unit 21 reduces the handover threshold (step S33), ending the processing for setting the handover threshold. On the other hand, if the intermittent communication cycle is not larger (step S32: NO), the handover-threshold setting unit 21 increases the handover threshold (step S34), ending the processing for setting the handover threshold.

FIG. 8 is a sequence chart for the cell selection processing performed by the mobile station apparatus according to the second example. As depicted in FIG. 8, base station A informs the mobile station apparatus of the intermittent communication cycle (step S41). Upon receiving the intermittent communication cycle, the mobile station apparatus performs the processing for setting the handover threshold depicted in FIG. 7 (step S31 to step S34). As a result of the processing, if the handover threshold becomes larger than the current reception level, the mobile station apparatus determines a need for handover to base station B, which has a higher reception level, and sends a handover request to base station B (step S42).

Base station B, in response to the handover request, returns a handover OK reply (step S43). Thus, handover is completed. If as a result of the processing for setting the handover threshold (step S31 to step S34), the handover threshold does not exceed the current reception level, there is no need to perform handover and thus, the mobile station apparatus does not output a handover request.

According to the second example, when the intermittent communication cycle is long, the handover threshold becomes smaller and thus, the mobile station is able to perform reception at an even lower reception level. Consequently, reception at an even lower reception level become possible, resulting an effect identical to the cell becoming larger is achieved. Hence, it becomes difficult for an occasion to arise where the mobile station crosses a cell boundary to an adjacent cell. Therefore, interruptions in communication at handover are able to be controlled. Further, when the intermittent communication cycle is short, the handover threshold becomes larger and thus, the mobile station is able to perform reception only at a higher level. As a result, an effect identical to the cell becoming smaller is achieved and the efficiency of frequency utilization increases.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A mobile station apparatus comprising:
    a receiver that receives a signal transmitted from a base station;
    a determining unit that determines an intermittent receiving cycle length based on the received signal and if the length of the intermittent receiving cycle is greater than a predetermined intermittent receiving cycle length, determining that the intermittent receiving cycle is long, else, determining that the intermittent receiving cycle is short; and
    a handover-threshold setting unit that sets a handover threshold based on the length of the intermittent receiving cycle, wherein
    the handover threshold is reduced from an existing handover threshold by the handover-threshold setting unit, thus, increasing a cell size covered by the base station, when the intermittent receiving cycle is long, and increased from the existing handover threshold, thus decreasing the cell size, when the intermittent receiving cycle is short.

2. The mobile station apparatus according to claim 1, wherein the handover-threshold setting unit continuously changes the handover threshold based on the intermittent receiving cycle.

3. The mobile station apparatus according to claim 2, wherein the handover-threshold setting unit, by comparing the intermittent receiving cycle with a threshold, determines whether the intermittent receiving cycle is long or short.

4. The mobile station apparatus according to claim 1, further comprising a control unit that compares the handover threshold set by the handover-threshold setting unit and reception level of the signal received by the receiver, and determines whether handover is to be performed, wherein the control unit outputs a handover request via a transmitter when the handover threshold set by the handover-threshold setting unit exceeds the reception level.

5. A cell selecting method comprising:
- determining an intermittent receiving cycle length based on a signal received from a base station;
- if the length of the intermittent receiving cycle is greater than a predetermined intermittent receiving cycle length, determining that the intermittent receiving cycle is long, else, determining that the intermittent receiving cycle is short; and
- setting a handover threshold based on the length of the intermittent receiving cycle by reducing the handover threshold from an existing handover threshold, thus, increasing a cell size covered by the base station, when the intermittent receiving cycle is long, and increasing from the existing handover threshold, thus decreasing the cell size, when the intermittent receiving cycle is short.

6. The cell selecting method according to claim 5, further comprising: outputting a handover request when the handover threshold set at the setting exceeds a reception level of the signal intermittently received.

* * * * *